United States Patent
Nakayasu et al.

(10) Patent No.: US 6,883,830 B2
(45) Date of Patent: Apr. 26, 2005

(54) PRESSURIZED MEDIUM FOR INFLATOR

(75) Inventors: Masayuki Nakayasu, Himeji (JP); Yuzo Goto, Himeji (JP); Yasunori Iwai, Shijyonawate (JP)

(73) Assignee: Daicel Chemical Industries, Ltd., Osaka (JP)

( * ) Notice: Subject to any disclaimer, the term of this patent is extended or adjusted under 35 U.S.C. 154(b) by 42 days.

(21) Appl. No.: 10/252,789

(22) Filed: Sep. 24, 2002

(65) Prior Publication Data

US 2003/0085559 A1 May 8, 2003

Related U.S. Application Data

(60) Provisional application No. 60/359,981, filed on Feb. 28, 2002.

(30) Foreign Application Priority Data

Sep. 27, 2001 (JP) ........................ 2001-296774

(51) Int. Cl.[7] .............................................. B60R 21/26
(52) U.S. Cl. ...................................... 280/736; 280/741
(58) Field of Search ................................ 280/736, 737, 280/741, 742; 222/3; 102/530, 531

(56) References Cited

U.S. PATENT DOCUMENTS

| | | |
|---|---|---|
| 3,680,886 A | 8/1972 | Mazelsky |
| 3,756,621 A | 9/1973 | Lewis et al. |
| 3,868,124 A | 2/1975 | Johnson |
| 3,884,497 A | 5/1975 | Massengill et al. |
| 3,966,225 A | 6/1976 | Marlow |
| 4,018,457 A | 4/1977 | Marlow |
| 4,981,534 A | 1/1991 | Scheffe |
| 5,022,674 A | 6/1991 | Frantom et al. |
| 5,031,932 A | 7/1991 | Frantom et al. |
| 5,076,607 A | 12/1991 | Woods et al. |
| 5,199,740 A | 4/1993 | Frantom et al. |
| 5,257,819 A | 11/1993 | Frantom et al. |
| 5,388,859 A | 2/1995 | Fischer et al. |
| 5,433,476 A | 7/1995 | Materna et al. |
| 5,504,288 A | 4/1996 | Morin |
| 5,513,572 A | 5/1996 | Frantom et al. |
| 5,527,066 A | 6/1996 | Svensson |
| 5,551,723 A | 9/1996 | Mahon et al. |
| 5,580,085 A | 12/1996 | Cuevas et al. |
| 5,584,504 A | 12/1996 | Cuevas et al. |
| 5,613,703 A | 3/1997 | Fischer |
| 5,762,368 A * | 6/1998 | Faigle et al. ............... 280/737 |
| 5,782,486 A | 7/1998 | Barnes et al. |
| 5,913,537 A * | 6/1999 | Goetz ....................... 280/741 |
| 5,975,570 A | 11/1999 | Bosio |
| 6,010,152 A | 1/2000 | Swann et al. |
| 6,022,045 A | 2/2000 | Faigle |
| 6,068,289 A | 5/2000 | Bosio |
| 6,106,008 A | 8/2000 | Blackshire et al. |
| 6,155,600 A | 12/2000 | Reynolds et al. |
| 6,170,868 B1 | 1/2001 | Butt et al. |
| 6,332,404 B1 * | 12/2001 | Rink et al. ............... 102/530 |
| 6,543,806 B1 * | 4/2003 | Fink ......................... 280/737 |

FOREIGN PATENT DOCUMENTS

| | | |
|---|---|---|
| EP | 0790158 A1 | 8/1997 |
| EP | 0796179 B1 | 4/2001 |
| JP | 52-86632 A | 7/1977 |
| JP | 8-133000 A | 5/1996 |
| WO | WO 96/18527 A1 | 6/1996 |

* cited by examiner

*Primary Examiner*—David R. Dunn
(74) *Attorney, Agent, or Firm*—Birch, Stewart, Kolasch & Birch, LLP

(57) ABSTRACT

The present invention provides an inflator capable of prolonging the duration of inflation of an air bag. Since an inflator housing 12 of an inflator 10 for a curtain air bag is charged with a pressurized medium comprising a mixed gas of He and Ar (He:Ar=3:7 to 7:3), the sound velocity of the pressurized medium is smaller than that of a pressurized medium comprising He only, and the viscosity of the former is higher than that of the latter, so that the duration of the inflation of an air bag can be prolonged.

11 Claims, 4 Drawing Sheets

US 6,883,830 B2

PRESSURIZED MEDIUM FOR INFLATOR

This application claims priority on provisional Application No. 60/359,981 filed on Feb. 28, 2002, the entire contents of which are hereby incorporated by reference.

BACKGROUND OF THE INVENTION

1. Field of the Invention

The present invention relates to a pressurized medium for an inflator suitable for an inflator which is mounted in various kinds of vehicles to protect a passenger when a vehicle has received an impact from the lateral direction of the vehicle, an inflator and an air bag apparatus.

2. Description of Related Art

As an inflator for inflating type safety system of an automobile, in order to optimally protect a passenger in accordance with a position of a seat in a vehicle such as a driver side, a front passenger side next to the driver and the like, there are known various kinds of inflators such as an air bag inflator for a driver side, an air bag inflator for a front passenger side next to the driver, an air bag inflator for a side collision, an inflator for a curtain air bag, an inflator for a knee-bolster air bag, an inflator for an inflatable seat belt, an inflator for a tubular system and an inflator for pretensioner and the like.

Among these inflators, an inflator for a curtain air bag inflates and develops the air bag instantaneously to make a curtain having a thickness of some centimeters over windows of a vehicle when the vehicle has received an impact from a side of the vehicle. The curtain air bag is for the sake of protecting a passenger from an impact applied from the lateral direction of the vehicle, and from an impact when the vehicle is overturned. Therefore, it is necessary to shorten the period to the time when the air bag inflates as compared with a case in which the vehicle receives an impact from the front or from the behind. Further, on account of the period of overturning, the duration of the inflation has to be set to a few seconds.

As described above, in the inflator for a curtain air bag, the period to the time when the air bag inflates has to be shortened and the duration of the inflation has to be prolonged. Therefore, a method of inflating an air bag only with a pressurized medium, not with a gas generating agent is adopted. When a combustion gas of the gas generating agent is used, the air bag can be inflated instantaneously, however, because of a high temperature inside the inflated air bag, the combustion gas discharged into the air bag is cooled by a temperature difference with respect to the ambient temperature and the air bag is immediately deflated.

Meanwhile, when only the pressurized medium is used, since a temperature of the pressurized medium is lowered due to release of the pressure, the temperature in the air bag is also lowered. Therefore, the air bag is heated by a temperature difference with respect to the ambient temperature, and the duration of the inflation can be held for a few seconds. In view of securing safety of a passenger, however, it is required to maintain a higher internal pressure in the air bag for a longer period. Further, since the air bas is manufactured by sawing cloths, the pressured medium leaking from a seam thus reducing air bag internal pressure is also a factor of lowering of the air bag internal pressure and shortening of the inflating period of the air bag. Therefore, improvement based on this point will be an effective method.

Incidentally, as related conventional techniques, a device for inflating a flexible container using helium and hydrogen is disclosed in U.S. Pat. No. 5,527,066. A gas flow device for an air bag using a pressurized inert gas is disclosed in U.S. Pat. No. 5,782,486. An air bag apparatus for inflating an air bag by nitrogen or helium is disclosed in U.S. Pat. No. 3,680,886.

SUMMARY OF THE INVENTION

An object of the present invention is to provide a pressurized medium for an inflator suitable for inflating an air bag, which may prolong duration of the inflation of an air bag, an inflator, and an air bag apparatus.

The present invention provides, as one means or solving the above-described problem, a pressurized medium charged in an inflator of a type in which a body adapted to be inflated is mainly inflated with a pressurized medium, wherein the pressurized medium comprises helium and argon and the mixing ratio thereof is in the range of helium: argon=3:7 to 7:3 by molar ratio.

Also, the present invention provides, as other means for solving the above-described problem, an inflator using the above-described pressurized medium for an inflator and an air bag apparatus using the above-described inflator.

By applying the pressurized medium for an inflator of the present invention to an inflator for an air bag, damage to the air bag due to a rapid discharge of the pressurized medium from the inflator can be suppressed, and the air bag may be inflated for a longer period with a higher pressure.

DESCRIPTION OF NUMERALS

Figure 1:
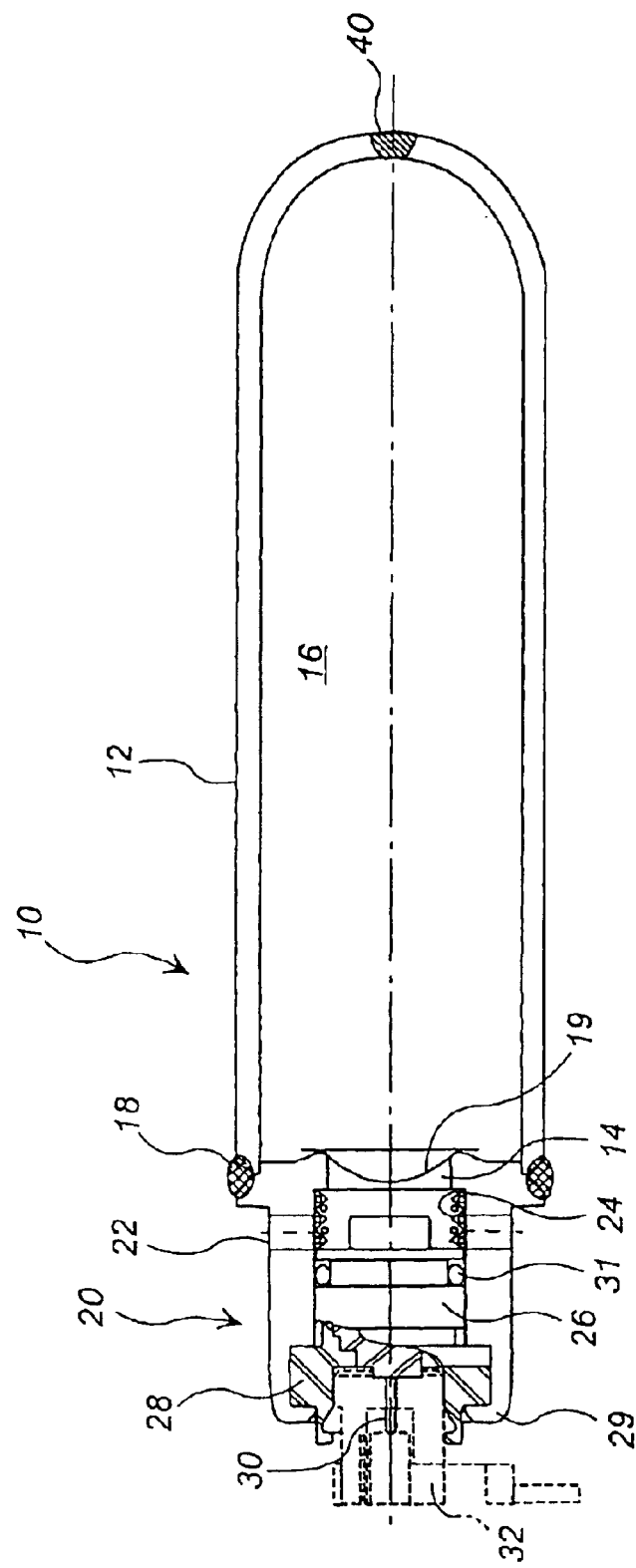
FIG. 1 is a sectional view of an inflator of the present invention in the longitudinal direction.

10 inflator
12 inflator housing
19 rupturable plate
20 diffuser portion
26 igniter

DETAILED DESCRIPTION OF THE INVENTION

A pressurized medium for an inflator of the present invention comprises a mixture of helium and argon. The pressurized medium does not contain another gas as a component for the pressurized medium but it may contain another gas to such an extent that it exists as impurities. The mixing ratio of helium and argon in the pressurized medium is in the range of 3:7 to 7:3 by molar ratio, preferably, 4:6 to 6:4.

The sound velocity of the pressurized medium for an inflator of the present invention is preferably 400 to 800 m/s at 23° C., and more preferably, 500 to 700 m/s.

The coefficient of viscosity of the pressurized medium for an inflator of the present invention is preferably 25 to 40 $\mu$Pa·s at 300° K. at 50 MPa, and more preferably, 30 to 40 $\mu$Pa·s.

In the pressurized medium for an inflator of the present invention, as the result of a tank pressure test conducted within a tank under the following conditions, the pressure reducing rate of a tank internal pressure after 0.5 seconds is preferably not more than 25%, and more preferably, not more than 22%

Further, as the result of the tank pressure test conducted within a tank under the following conditions, it is desirable that the tank internal pressure from activation of the inflator preferably up to elapse of 4 seconds, and more preferably up to elapse of 4.5 seconds does not become 0 kPa.

(Tank Pressure Test)

A tank pressure test is conducted such that, after an inflator, charged with a pressurized medium under pressure of 50,000 kPa and having 33 mm² of a total opening area of a gas discharging port, is inserted into a tank having a single hole with a diameter of 6 mm and an inner volume of 28.3 liters, the inflator is activated to discharge the pressurized medium to measure a pressure change inside a tank. The tank is a cylinder in shape, having both end surfaces closed, and also having a single hole with a diameter of 6 mm at the center of the one end surface. The pressure change is measured by a pressure change detecting sensor attached to a periphery of the tank.

When the pressurized medium for an inflator of the present invention is applied to, for example, an inflator for an air bag of an automobile, the following operation is effected.

Since helium has such a property that, even when a change in pressure occurs, the coefficient of viscosity hardly changes, but argon has such a property that the coefficient of viscosity increases according to rising of pressure, when the pressurized medium of the present invention is charged in the inflator under a high pressure, the viscosity of the pressurized medium as a whole becomes high. Since, when the pressurized medium is discharged from the inflator, a smooth discharge of the pressurized medium from the gas discharge port is blocked due to increase in viscosity, the gas discharging speed is made slower as compared with a pressurized medium comprising 100% helium. Therefore, the air bag is not damaged due to a rapid ejection, and the duration of the inflation of the air bag is also prolonged because the duration of the ejection of the pressurized medium becomes longer.

Further, when the pressurized medium is ejected in the air bag, it becomes harder for the pressurized medium to leak from a seam formed at a time of sawing the air bag because the viscosity of the pressurized medium is higher, as compared with the pressurized medium of 100% helium. For this reason, since the internal pressure of the air bag is harder to become lower, the duration of the inflation of the air bag can be prolonged while maintaining a higher internal pressure. Incidentally, since when the pressurized medium comprises 100% argon, the coefficient of viscosity of the pressurized medium becomes excessively high, there is a possibility that the duration of the ejection of the pressurized medium from the inflator is excessively prolonged, so that the air bag can not be inflated and developed within a required period.

The pressurized medium for an inflator of the present invention can be charged in a pressure-resistant container and stored therein, and helium and argon stored in individual pressure-resistant containers may be mixed when they are charged in an inflator.

Next, one embodiment of an inflator using the pressurized medium for an inflator of the present invention will be explained with reference to FIG. 1. FIG. 1 is a sectional view in the longitudinal direction of an inflator 10 for a curtain air bag.

One end of an inflator housing 12 has an opening portion 14, and the other end thereof is closed. An inner space 16 is charged with the above-described pressurized medium for an inflator. The pressurized medium is charged from a small hole provided at an end portion of the inflator housing 12, and the small hole is closed by welding or the like after a sealing pin is fitted into the small hole. Reference numeral 40 indicates a state in which the small hole is closed by welding. Incidentally, a cross section of the inflator housing 12 in the widthwise direction is circular in shape, and the opening portion 14 is also circular in shape.

A diffuser portion 20 is fixed, at a connection portion 18 by welding, in the opening portion 14 side on the inflator housing 12. An outer shell of the diffuser portion 20 is formed with a diffuser housing 28. The diffuser portion 20 has a gas discharging port 22 for discharging the pressurized medium flowing from the opening portion 14 at actuation, and a filter 24 made of wire mesh is provided to cover the gas discharging port 22 from the inside. Thus, the pressurized medium is discharged out of the gas discharging port 22 always through the filter 24.

The total area ($A_1$) of the gas discharging port 22 and the area ($A_2$) of the opening portion 14 of the inflator housing 12 are set to $A_1/A_2 \leq 1$, preferably $A_1/A_2 < 1$, more preferably $A_1/A_2 \leq 0.95$, and still more preferably $A_1/A_2 \leq 0.85$. It is preferable that the lowest value of $A_1/A_2$ is 0.015.

The opening portion 14 of the inflator housing 12 is closed with a rupturable plate 19 arranged to the diffuser portion 20. Before actuation, the inner space 16 of the inflator housing 12 is maintained in a high-pressure airtight state, and the diffuser portion 20 is under the normal pressure. Such an inflator housing 12 can be formed in accordance with swaging or spinning a pipe with a uniform diameter.

The diffuser portion 20 is provided with an igniter 26 having a priming as rupturing means for the rupturable plate 19. The igniter 26 is fitted into the diffuser housing 28 and mounted to the diffuser portion 20, and is fixed by crimping an end portion 29 of the diffuser housing 28. Reference numeral 30 represents a conductive pin to electrify the igniter 26, reference numeral 31 represents an O-ring, and reference numeral 32 shown with a broken line represents a connector adapted to be connected to a power supply when the inflator is mounted to the vehicle.

Next, the operation at the time of the activation of the inflator 10 for a curtain air bag will be explained. When mounted to the vehicle, the inflator 10 for a curtain air bag is mounted as an air bag apparatus comprising activation signal-outputting means including an impact sensor and a control unit, and a module case accommodating the above inflator 10 for a curtain air bag and a curtain air bag. When the vehicle receives an impact, the igniter 26 is activated upon receiving a signal from the impact sensor of the above apparatus, the priming is ignited and burnt to rupture the rupturable plate 19.

The opening portion 14 is opened due to rupture of the rupturable plate 19, and the pressurized medium in the inner space 16 is discharged out of the gas discharging port 22 via the filter 24 to inflate the curtain air bag. At this time, since the pressurized medium includes a proper amount of argon, its viscosity becomes higher as compared with that of a pressurized medium comprising 100% helium, so that the pressurized medium becomes harder to be discharged from the gas discharging port 22 smoothly. As a result, since the discharging speed of the pressurized medium becomes slow, the duration of the inflation of the air bag may be prolonged correspondingly. Also, the discharging pressure of the pressurized medium is controlled by the gas discharging port 22, and the filter 24 prevents combustion residues of the priming and fragments of the rupturable plate 19 from being ejected into the curtain air bag.

The pressurized medium under a high pressure is released at once, and the temperature inside the inflated air bag becomes lower but heated by the difference from the ambient temperature, and thereby the inflation of the air bag is maintained for a few seconds. And, since the pressurized medium discharged into the air bag contains a proper amount of argon, the viscosity thereof is higher as compared with that of a pressurized medium comprising 100% helium, so that leakage from a seam formed at a time of sawing the air bag hardly occurs. Therefore, the air bag can be left in a high internal pressure correspondingly, and the duration of the inflation may be made longer.

When 100% argon (the theoretical value of the sound velocity at 230° C.=332 m/s) is used as the pressurized medium, the duration of the inflation may be prolonged as described above, but such a use is impractical because too much time is required from the collision to inflation and development of the air bag. Also, even when 100% helium is used as the pressurized medium, its discharging speed can be close to the discharging speed obtained when the pressurized medium of the present invention is used. However, regarding the ability to maintain the air bag internal pressure, the pressurized medium using 100% helium is not effective at all, and the pressurized medium of the present invention is also superior to the other pressurized mediums for an inflator from this point.

Incidentally, when the inflator 10 is applied as a side inflator, an air bag is connected to the gas discharging port 22 directly or via a proper adapter.

EXAMPLES

The present invention will be explained more specifically by referring the examples. However, the present invention is not limited thereto.

EXAMPLE 1 and COMPARATIVE EXAMPLE 1

Using the inflators (the total area of the gas discharging port 22: 33 mm$^2$) shown in FIG. 1, inflators, in which a mixed gas of helium:argon=about 1:1 (1.62 mol in total; the theoretical value of the sound velocity at 23° C.=671 m/s) (Example 1), and a gas comprising only helium (helium of 1.7 mol; the theoretical value of the sound velocity at 23° C.=1010 m/s) (Comparative Example 1) were charged as the pressurized medium under the charging pressure of 50,000 kPa respectively, were produced. Using these inflators, tank pressure tests (at the normal temperature) were conducted. The results are shown in FIG. 2 and FIG. 3.

Figure 2:
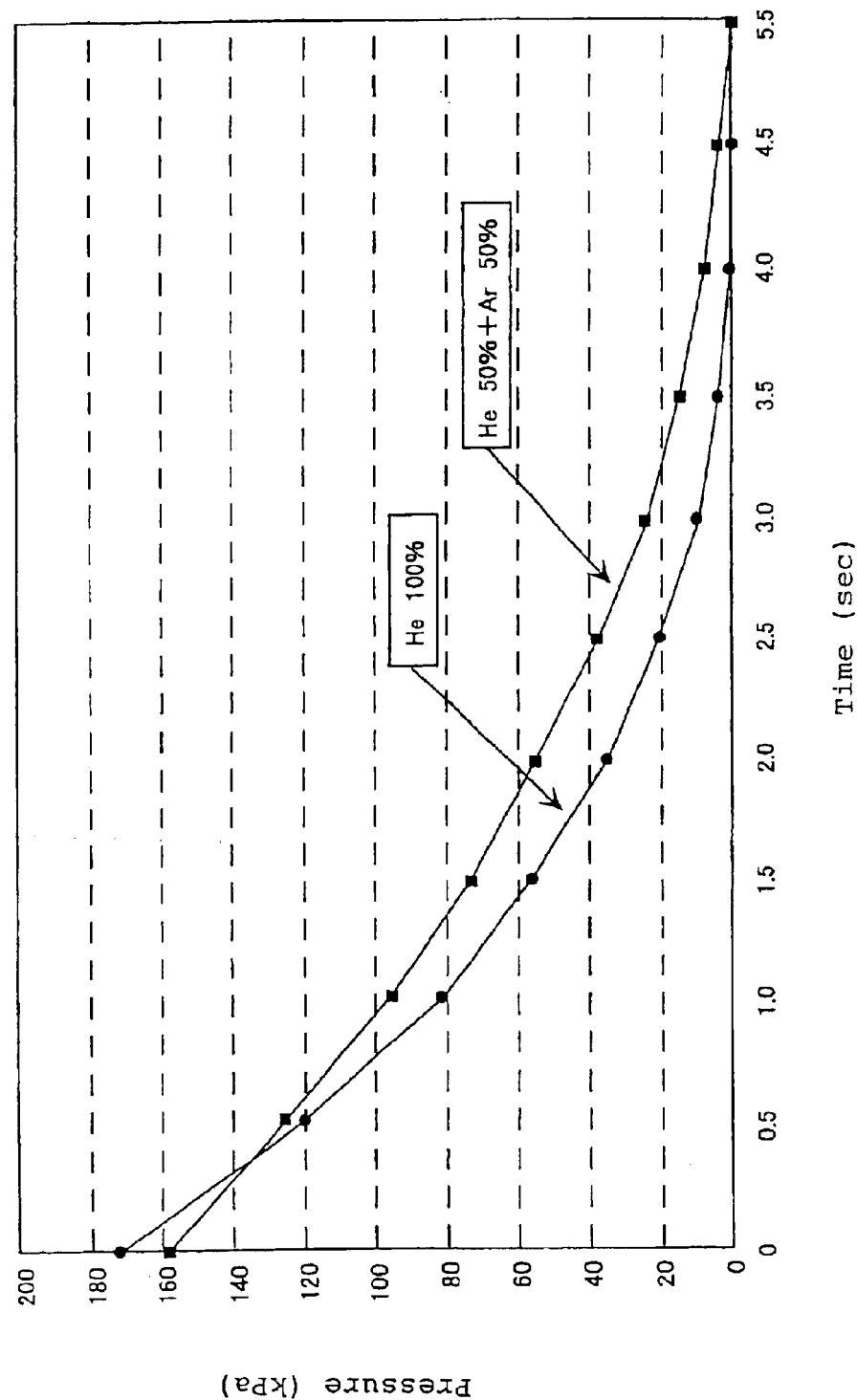
FIG. 2 is a diagram showing the results of a tank pressure test in Embodiment 1 and Comparative Example 1.

FIG. 2 shows test results of changes with time of the tank internal pressure. The tank internal pressure indicates on an ordinate and the time (sec) indicates on an abscissa. A time point when the tank internal pressure has become the maximum is defined as 0 sec. As apparent in FIG. 2, it is shown that the changes with time in pressure reduction in Example 1 (He 50%+Ar 50%) is smaller so that the air bag may be inflated for a longer term, as compared with Comparative Example 1 (He 100%).

Figure 3:
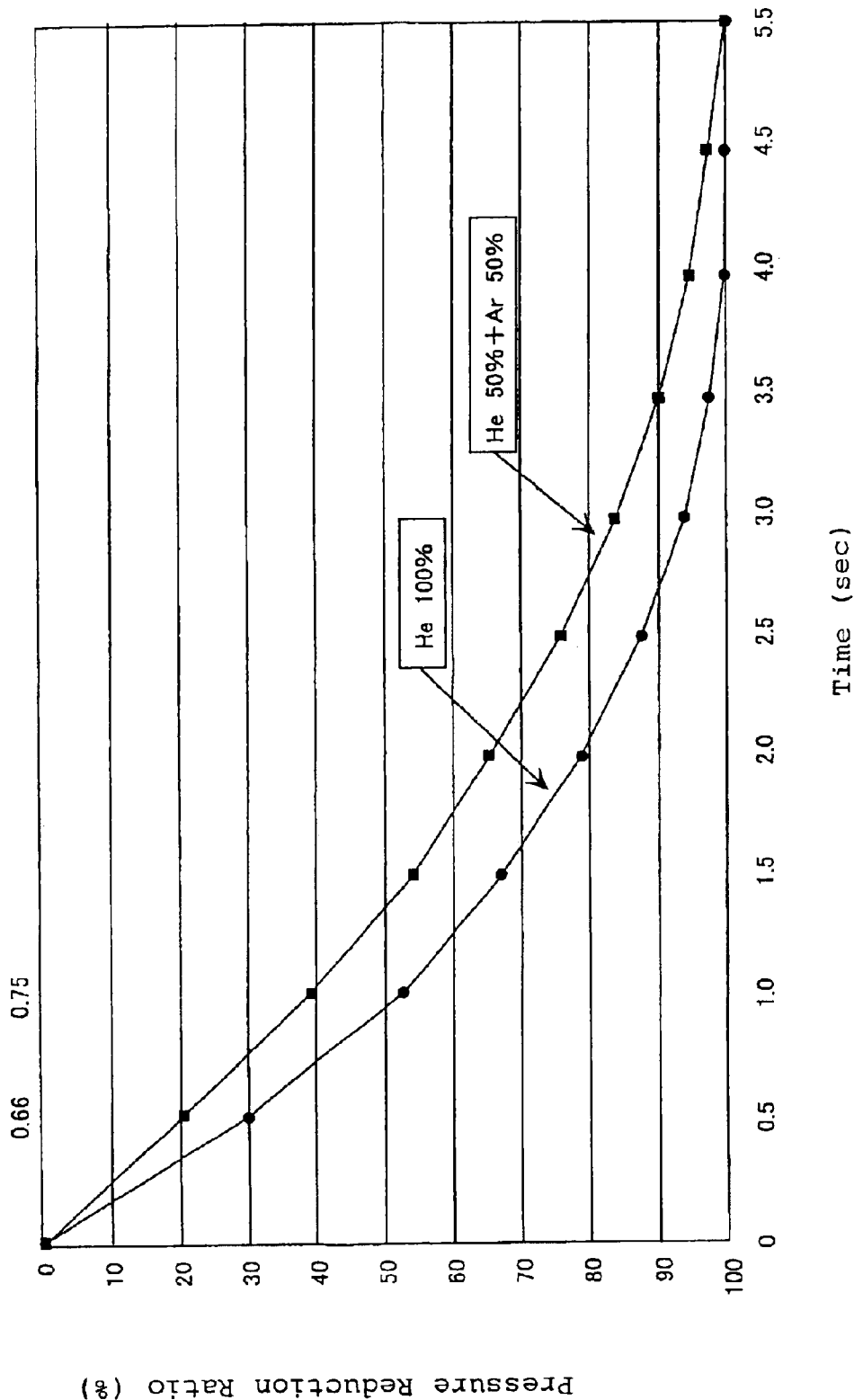
FIG. 3 is a diagram showing the results of the tank pressure test in the Embodiment 1 and the Comparative Example.
Figure 4:
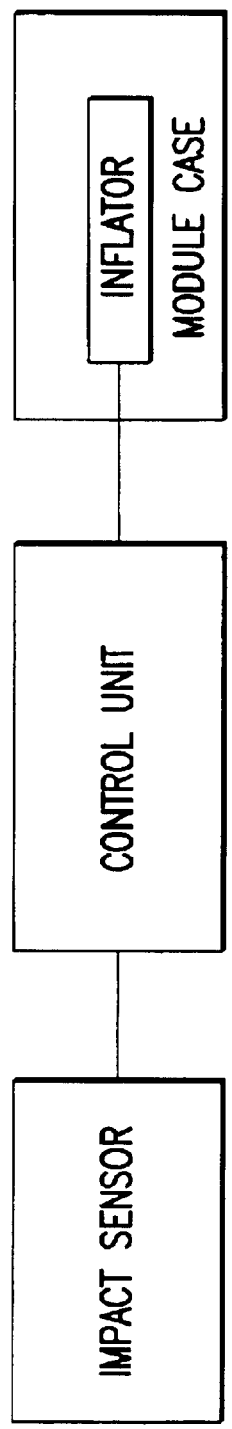
FIG. 4 illustrates an air bag apparatus according to an embodiment of the present invention.

FIG. 3 shows test results of changes with time of a degree of reduction of a tank internal pressure (pressure reduction rate). The pressure reduction rate indicates on an ordinate, the maximum value of the tank internal pressure is defined as a pressure reduction rate of 0%, the time (sec) indicates as an abscissa, and a pressure reduction rate of 0% is defined as 0 sec on the basis of FIG. 2. As apparent in FIG. 3, it is shown that the reduction rate of the tank internal pressure in Example 1 is smaller so that the air bag therein can be inflated with a higher pressure for a longer term, as compared with Comparative Example 1.

In FIG. 3, particularly, using a ratio of pressure reduction rates of Example 1 (He 50%+Ar 50%) and Comparative Example 1 (He 100%) after 0.5 seconds from the tank maximum value, Example 1/Comparative Example 1=20%/30%=about 0.66 is obtained, and this value approximately corresponds to the ratio of the sound velocities, namely, Example 1/Comparative Example 1=671 (m/s)/1010 (m/s)= about 0.66. Therefore, it is considered that pressure drop occurs in proportion to the sound velocity until 0.5 seconds elapse from the time point (the time point of 0 sec on the abscissa) of the maximum value of the tank pressure.

What is claimed is:

1. An inflator for inflating an air bag, comprising:
    an inflator housing having an opening portion at one end thereof;
    a diffuser portion attached to the opening portion of the inflator housing and provided with at least one gas discharging port, a ratio (A1/A2) of a total area (A1) of the at least one gas discharging port and an area (A2) of the opening portion being equal to or greater than 0.015 and equal to or smaller than 1; and
    a pressurized medium contained in the inflator housing, the pressurized medium consisting mainly of a mixture of helium and argon, and a coefficient of viscosity of the pressurized medium being 25 to 40 μPas at 50 MPa and at 300° K.

2. An inflator according to claim 1, wherein sound velocity of the pressurized medium is 400 to 800 m/s at 23° C.

3. An inflator according to claim 1, wherein, when a tank test is conducted such that, after the inflator charged with the pressurized medium under pressure of 50,000 kPa and having 33 mm$^2$ of a total opening area of the at least one gas discharging port is inserted into a tank having a single hole with a diameter of 6 mm and an inner volume of 28.3 liters, the inflator is activated to discharge the pressurized medium to measure a pressure change inside a tank, the pressure reduction amount of a tank internal pressure at 0.5 seconds after the activation of the inflator becomes not more than 25%.

4. The inflator according to claim 3, wherein the tank internal pressure does not become 0 kPa until four seconds elapse from activation of the inflator.

5. An inflator according to claim 1, further comprising:
    a rupturable plate closing the flow passage of the pressurized medium between the opening portion of the inflator housing and diffuser portion; and
    rupturing means for rupturing the rupturable plate.

6. An air bag apparatus, comprising:
    activation signal-outputting means including an impact sensor and a control unit;
    a module case accommodating an inflator according to claim 1; and
    an air bag.

7. An air bag apparatus, comprising:
    activation signal-outputting means including an impact sensor and a control unit;
    a module case accommodating an inflator according to claim 5; and
    an air bag.

8. An inflator according to claim 1, wherein the ratio is smaller than 1.

9. An inflator according to claim 1, wherein the ratio is smaller than 0.95.

10. An inflator according to claim 1, wherein the ratio is smaller than 0.85.

11. An inflator according to claim 1, wherein a ratio (helium:argon) of the mixture of the pressurized medium is in a range of 3:7 to 7:3 by molar ratio.

* * * * *